United States Patent Office.

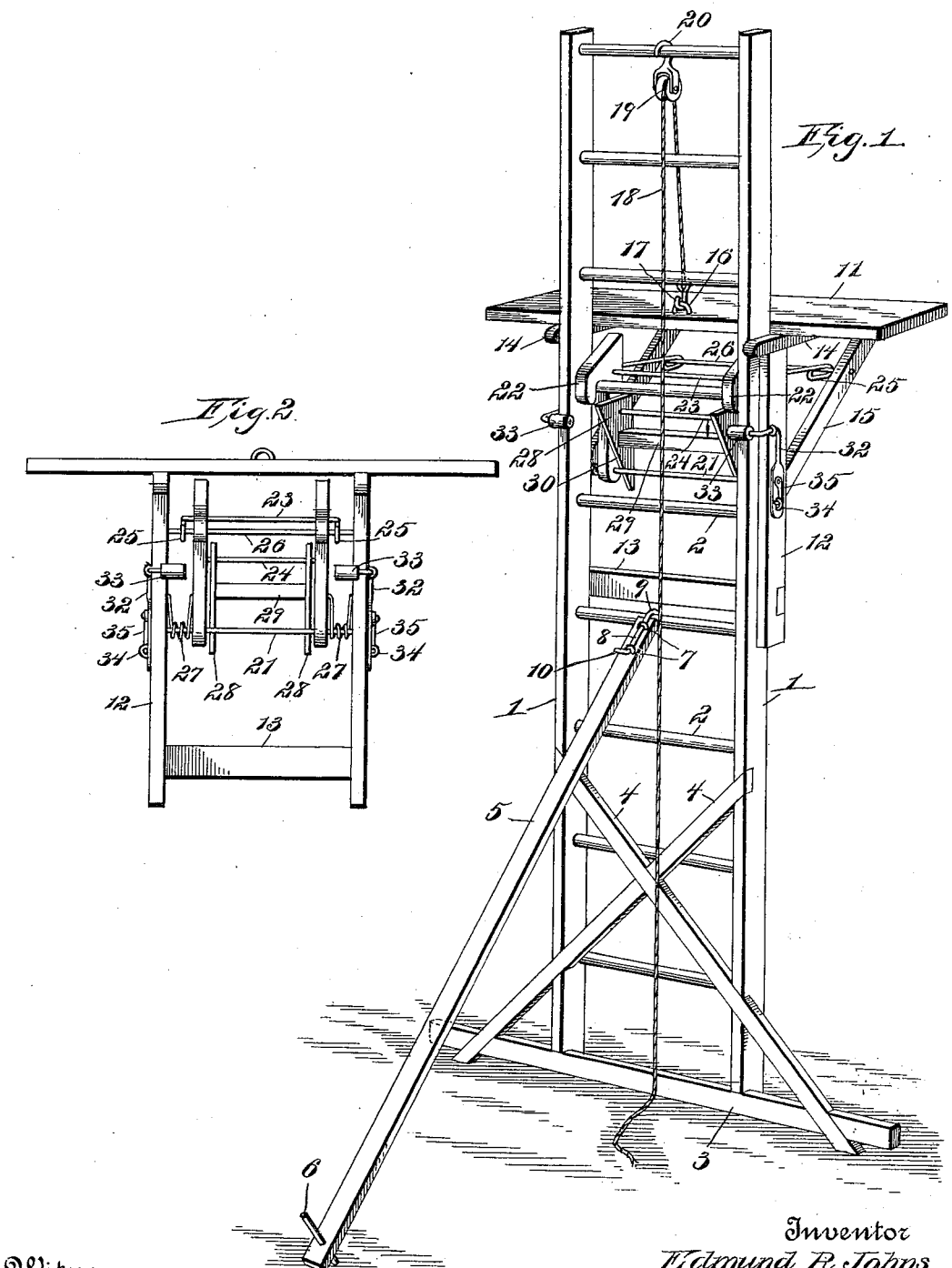

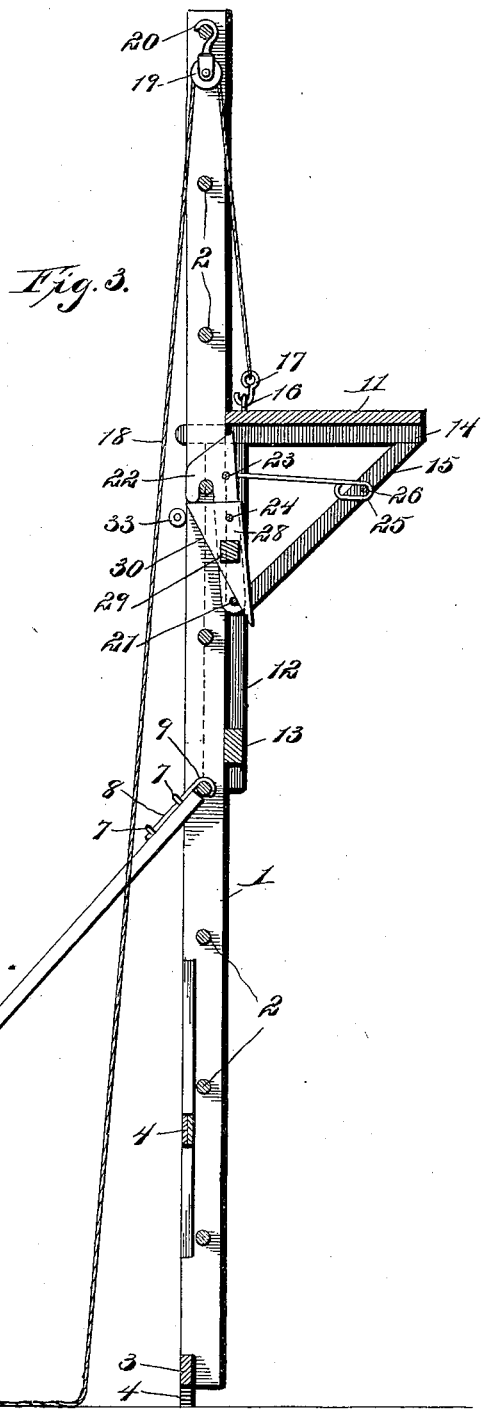

EDMUND R. JOHNS, OF ANNAPOLIS, ILLINOIS.

COMBINED LADDER AND SCAFFOLD-SUPPORT.

SPECIFICATION forming part of Letters Patent No. 651,665, dated June 12, 1900.

Application filed October 7, 1899. Serial No. 732,938. (No model.)

*To all whom it may concern:*

Be it known that I, EDMUND R. JOHNS, a citizen of the United States, residing at Annapolis, in the county of Crawford and State of Illinois, have invented certain new and useful Improvements in a Combined Ladder and Scaffold-Support, of which the following is a specification.

My invention relates to a combined ladder and scaffold-support, the object being to provide means whereby a scaffold may be readily adjusted vertically and securely held in its adjusted position.

The construction of the improvement will be fully described hereinafter in connection with the accompanying drawings, which form a part of this specification, and its novel features will be defined in the appended claims.

In the drawings, Figure 1 is a view in perspective of a combined ladder and adjustable scaffold embodying the invention. Fig. 2 is a rear elevation of the scaffold and its supporting and securing devices detached from the ladder, and Fig. 3 is a vertical section of Fig. 1.

The reference-numeral 1 designates the side bars of the ladder, and 2 the rounds thereof. The lower ends of the side bars 1 are secured to a base 3, which is braced to the side bars by crossed diagonal braces 4.

5 designates an inclined brace, the lower end of which is formed with an opening to receive a pin 6 for securing the brace to the ground. The upper end of the brace 5 is provided with loops or keepers 7, which support a rod 8, formed with a hook 9 at its upper end, adapted to be hooked over one of the rounds 2 and bent at its lower end to form an arm 10 to prevent the rod from pulling out of its keepers.

11 designates the platform of a scaffold secured to a movable frame comprising parallel vertical bars 12, overlapping the outer sides of the side bars 2, a cross-bar 13, securing the lower ends of the bars 12 together, and parallel horizontal bars 14, secured to the upper ends of the bars 12 and braced to said bars 12 by inclined braces 15. A loop or staple 16 projects from the upper surface of the platform 11, to which is attached a hook 17, secured to one end of a rope 18, which passes over a pulley 19, suspended by a hook 20 from the top round of the ladder.

21 designates a rod secured at its ends in the vertical bars 12, and said rod extends through openings in the lower ends of a pair of upwardly-extending hooks 22, connected by cross-rods 23 and 24. The ends of the cross-rods 23 are bent forward at right angles and terminate in elongated loops 25, through which extends a rod 26, which connects the diagonal braces 15, said loops serving to guide the hooks in their movement.

Upon the rod 21, between each of the hooks 22 and the adjacent inner sides of the bars 12, is arranged a coil-spring 27, the outer ends of said springs being secured to the bars 12, while their inner ends are secured to the outer sides of the hooks 22, the tendency of the springs being to press the hooks toward the rounds of the ladder.

Upon the cross-rod 24 of the hooks 22 are suspended two parallel latches 28, connected by a cross-bar 29 and having their rear sides 30 inclined or beveled to adapt them to be struck by the rounds of the ladder as the platform descends and having flat upper ends 31, adapted to be struck by the ladder-rounds as the platform ascends.

To clamp the scaffold-frame to the side bars of the ladder, I provide angle-irons 32, secured one to the outer side of each of the vertical bars 12. The upper horizontal arm of each of these angle-irons is bent at right angles to extend parallel to the edge of the side bars of the ladder and is provided with an antifriction-roller 33. The lower end of each of said angle-lines 32 is slotted to constitute a hasp to take over a loop or staple 34, projecting from the side bars 1 and adapted to be secured by hooks 35, pivoted upon the hasps and engaging the loops 34.

The operation of the mechanism as thus described is as follows: When the scaffold is raised by means of the rope 18, the inclined surfaces of the hooks 22 strike against the rounds, forcing said hooks away from the rounds. As soon as the hooks pass a round the springs 27 force said hooks toward the round, and if it is desired to stop the scaffold the hooks engage the round, as shown in Fig. 3. The hooks, however, will freely pass the rounds as the scaffold ascends, the contact of the rounds with the upper surfaces 31 of the latches causing the latter to tilt to pass the rounds. In descending the inclined surfaces of the latches strike the rounds and force the hooks 22 away from the ladder, so that said hooks cannot engage the rounds of the ladder while the scaffold is descending. A reverse or upward movement at any point, however, permits the hooks to engage the nearest round to support the scaffold therefrom.

I claim—

1. The combination with a ladder, and means for bracing the same in upright position; of a scaffold consisting of vertical bars, horizontal bars and a platform secured to the latter; a transverse rod secured to said vertical bars; hooks pivotally secured upon said rod; coil-springs upon said rod for forcing the hooks toward the rounds of the ladder; tilting latches pivoted upon a cross-rod extending between the hooks and having beveled inner sides, and flat upper ends; means for raising and lowering the scaffold; and means for clamping the scaffold to the side bars of the ladder.

2. The combination with a ladder, and a scaffold supported thereon, of means for clamping the scaffold to the side bars of the ladder, comprising slotted angle-arms, carrying rollers, secured to the scaffold-frame; loops or staples projecting from the ladder, and hooks engaging said loops or staples.

In testimony whereof I affix my signature in presence of two witnesses.

EDMUND R. JOHNS.

Witnesses:
  WILSON C. MYERS,
  F. J. C. GRIFFITH.